(12) United States Patent
Sugiyama et al.

(10) Patent No.: US 7,311,994 B2
(45) Date of Patent: Dec. 25, 2007

(54) SEPARATOR FOR LITHIUM ION SECONDARY BATTERY AND LITHIUM ION SECONDARY BATTERY PROVIDED THEREWITH

(75) Inventors: Masahide Sugiyama, Shizuoka (JP); Hiroki Totsuka, Shizuoka (JP); Shuuji Mitani, Shizuoka (JP); Masanori Takahata, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 10/659,358

(22) Filed: Sep. 11, 2003

(65) Prior Publication Data

US 2004/0053122 A1   Mar. 18, 2004

(30) Foreign Application Priority Data

Sep. 17, 2002 (JP) .......................... P2002-270620
Oct. 24, 2002 (JP) .......................... P2002-309623

(51) Int. Cl.
*H01M 2/16* (2006.01)

(52) U.S. Cl. ....................... 429/144; 429/254

(58) Field of Classification Search ................ 429/129, 429/132, 138, 141, 142, 144, 145, 247, 254; 264/41, 211.19, 211.2, 210.3
See application file for complete search history.

(56) References Cited

U.S. PATENT DOCUMENTS

| | | | |
|---|---|---|---|
| 5,830,603 A * | 11/1998 | Oka et al. ................. | 429/249 |
| 2001/0004502 A1 | 6/2001 | Nakamizo | |
| 2001/0005560 A1 | 6/2001 | Yoshida et al. | |
| 2002/0018930 A1 | 2/2002 | Hamano | |
| 2002/0028389 A1 * | 3/2002 | Sonoda et al. .............. | 429/324 |
| 2002/0142214 A1 * | 10/2002 | Pekala et al. ............... | 429/144 |
| 2003/0003363 A1 | 1/2003 | Daido et al. | |

FOREIGN PATENT DOCUMENTS

| | | |
|---|---|---|
| EP | 1 115 166 A1 | 7/2001 |
| EP | 1 191 622 A | 3/2002 |
| JP | HEI 06-176750 | 6/1993 |
| JP | HEI 05-307975 | 11/1993 |
| JP | HEI 08-111215 | 4/1996 |
| JP | HEI 09-161758 | 6/1997 |
| JP | HEI 09-213297 | 8/1997 |
| JP | HEI 10-106529 | 4/1998 |
| JP | 2001 118558 | 4/2001 |
| JP | 2001-118558 | 4/2001 |
| JP | 2001-176482 | 6/2001 |
| JP | 2001176482 * | 6/2001 |

(Continued)

*Primary Examiner*—Patrick Joseph Ryan
*Assistant Examiner*—Monique Wills
(74) *Attorney, Agent, or Firm*—Nixon & Vanderhye P.C.

(57) ABSTRACT

A separator for a lithium ion secondary battery, comprising a porous base material containing polyolefin, and a porous layer containing a vinylidene fluoride resin as a main component provided on at least one surface of the porous base material is excellent in electrolytic solution retention properties, adhesion and bondability to electrodes, and dimensional stability, and also has high and uniform ionic conductivity, reduced interfacial resistance to electrodes, and shutdown properties. A lithium ion secondary battery having excellent capacity characteristics, charge and discharge characteristics, cycle characteristics, safety and reliability can be provided by using the separator.

11 Claims, 1 Drawing Sheet

FOREIGN PATENT DOCUMENTS

| | | |
|---|---|---|
| JP | 2002-141042 | 5/2002 |
| JP | 2002-208393 | 7/2002 |
| JP | 2002-208438 | 7/2002 |
| JP | 2002 216734 A | 8/2002 |
| JP | 2002-240215 | 8/2002 |
| JP | 2003-45490 | 2/2003 |
| JP | 2003-59480 | 2/2003 |
| JP | 2003-86162 | 3/2003 |
| JP | 2003-223931 | 8/2003 |
| KR | 2002-0001035 | 1/2002 |
| KR | 2002-0080797 | 10/2002 |
| WO | WO 00/69010 A1 | 11/2000 |
| WO | WO 01/97957 A1 | 12/2001 |

\* cited by examiner

PVdF POROUS LAYER

POLYETHYLENE POROUS FILM

SEPARATOR FOR LITHIUM ION SECONDARY BATTERY AND LITHIUM ION SECONDARY BATTERY PROVIDED THEREWITH

BACKGROUND OF THE INVENTION

1. Field of the Invention

The present invention relates to a separator for a lithium ion secondary battery, and relates to a lithium ion secondary battery provided therewith.

This application is based on Japanese Patent Applications Nos. 2002-270620 and 2002-309623, the contents of which are incorporated herein by reference.

2. Description of Related Art

With recent rapid reductions in size, weight, and thickness, various information terminal devices such as note-type personal computers, cellular phones, and video cameras have widely been used. Also, they have begun to be used in hybrid automobiles and fuel cell automobiles.

Under these circumstance, demand for secondary batteries having high energy density as a power source for these automobiles has increased. A lithium ion secondary battery using a non-aqueous electrolyte has high operating voltage and it has already been put to practical use as a battery having high energy density. The lithium ion secondary battery has a structure such that the group of electrodes comprising a positive electrode, a negative electrode and a separator having electric insulating properties and liquid retention properties interposed between the positive electrode and the negative electrode are accommodated in a battery can which is capable of serving as a negative electrode terminal, together with a predetermined non-aqueous electrolytic solution such as an organic electrolytic solution, and the opening portion of the battery can is sealed through a sealing plate provided with a positive electrode terminal via an insulating gasket.

As described above, the lithium ion secondary battery has advantages such as high operating voltage and high energy density, but it has a problem in that leakage of an electrolytic solution is liable to occur because a volatile organic solvent is generally used as the electrolytic solution, and in that a sealing method of the battery was complicated. Also, there is pointed out a possibility of ignition due to overcharging and the use for automobiles is limited. Furthermore, higher energy density and extension of charge and discharge cycle life are strongly required.

Therefore, as the separator for lithium ion secondary battery, a porous film made of a polyolefin resin such as polyethylene or polypropylene, which is excellent in safety, is widely used. The porous film made of the polyolefin resin has so-called shutdown characteristics wherein a porous structure is converted into a non-porous structure due to heat fusion when the interior of the battery is heated, thereby to terminate the reaction between electrodes, thus preventing ignition of the organic solvent, and also has important characteristics to ensure safety of the lithium ion battery. Also, the polyolefin resin is suited for use as a separator material because of low reactivity with the organic solvent.

However, the porous film made of the polyolefin resin had a problem in that pores are merely filled with an electrolytic solution in the case of holding the electrolytic solution, and retention properties of the electrolytic solution are poor because the porous film has poor affinity with the electrolytic solution. Poor retention properties of the electrolytic solution sometimes caused problems such as decrease in capacity of the battery, deterioration of cycle characteristics and limitation of service temperature. Furthermore, the polyolefin resin is likely to form a space at the interface with electrodes because of poor bondability with the other resins or materials, thus causing a decrease in battery capacity and deterioration of charge and discharge characteristics.

To solve the above problems caused when using the porous film made of the polyolefin resin as the separator, use a polyvinylidene fluoride resin in place of the polyolefin resin was also investigated. The polyvinylidene fluoride resin has good affinity with the electrolytic solution and is also excellent in retention properties of the electrolytic solution and adhesion to electrodes.

However, in the case in which the separator made of the polyvinylidene fluoride resin holds the electrolytic solution, a dimensional change may occur due to swelling of the polyvinylidene fluoride resin. Such a dimensional change in the lithium ion secondary battery sometimes causes a problem in that insulating properties between electrodes cannot be maintained.

As the separator whose dimensional change is suppressed, for example, a composite resin film obtained by filling a reinforcing material layer composed of a polyolefin resin nonwoven fabric or polyolefin resin porous film with a polyvinylidene fluoride resin, and a composite resin film obtained by laminating a polyvinylidene fluoride layer with a reinforcing material layer are proposed (see, for example, Japanese Patent Application, First Publication No. 2001-176482).

In these composite resin films, the dimensional change caused by swelling of the polyvinylidene fluoride resin is suppressed, however, since the polyvinylidene fluoride resin has no pores, the polyvinylidene fluoride resin holds the electrolytic solution while uniformly swelling and gelling in the case of holding the electrolytic solution. In a uniformly gelled state, the fluidity of the electrolytic solution drastically deteriorates and the ionic conductivity decreases, resulting in decrease in battery capacity. Furthermore, even when using the porous film as the reinforcing material layer, shutdown characteristics are likely to be obstructed by the polyvinylidene fluoride resin in the case the porous film is filled with the polyvinylidene fluoride resin, thus the use of such a separator is limited.

As the separator, whose shutdown characteristics are not obstructed, having high ionic conductivity, a separator comprising a polyolefin microporous film and a polymer layer scattered on one or both surfaces of the polyolefin microporous film at a surface coating ratio of 50% or less is disclosed (see, for example, Japanese Patent Application. First Publication No. 2001-118558).

In such a separator, shutdown characteristics are not obstructed and high ionic conductivity can be satisfactorily maintained. However, since the surface is not uniformly coated with the polymer layer, ionic conductivity varies locally. When a difference in ionic conductivity arises, transfer of ions increases at the portion with low ionic conductivity, thereby forming local electrode dendrite and causing internal short-circuiting.

BRIEF SUMMARY OF THE INVENTION

An object of the present invention is to solve the above problems in conventional separators, thereby to provide a separator for a lithium ion secondary battery, which is excellent in electrolytic solution retention properties, adhesion and bondability to electrodes, and dimensional stability, and also has high and uniform ionic conductivity, reduced interfacial resistance to electrodes, and shutdown properties, and to provide a lithium ion secondary battery having excellent capacity characteristics, charge and discharge characteristics, cycle characteristics, safety and reliability by using the separator.

The separator for lithium ion secondary battery of the present invention (hereinafter referred to as a separator) comprises a porous base material containing polyolefin, and a porous layer containing a vinylidene fluoride resin as a main component provided on at least one surface of the porous base material.

The separator of the present invention has high ionic conductivity because of good retention properties of the electrolytic solution and good liquid permeability as well as excellent adhesion and bondability to electrodes. Also, the interfacial resistance is reduced and the safety is enhanced because of excellent adhesion and bondability to electrodes. Furthermore, the separator of the present invention also has dimensional stability and shutdown properties.

Therefore, the battery provided with the separator of the present invention is excellent in capacity characteristics, charge and discharge characteristics, cycle characteristics and safety, and exhibits high reliability.

BRIEF DESCRIPTION OF THE SEVERAL
VIEWS OF THE DRAWING

Figure 1:
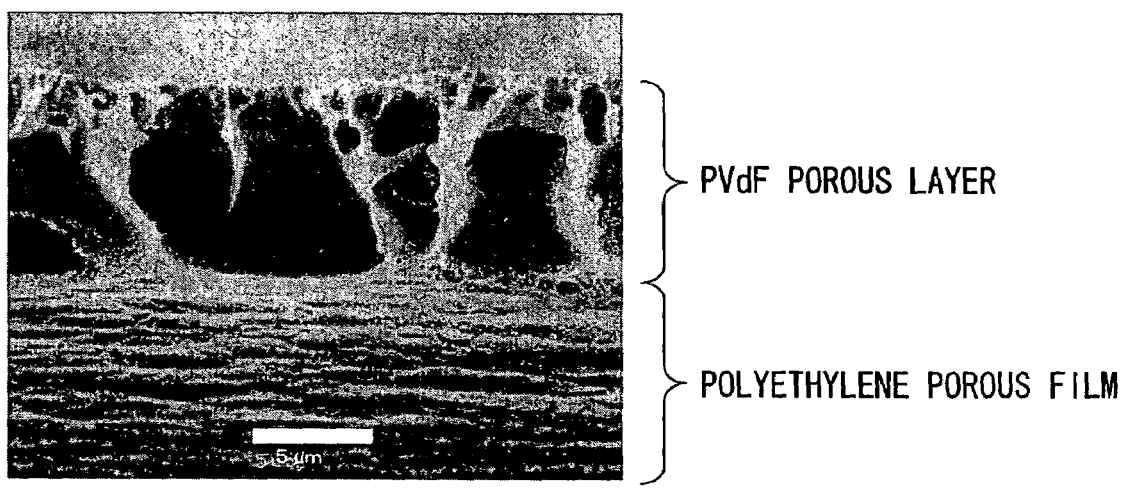
FIG. 1 is a SEM micrograph showing a longitudinal cross section of a separator obtained in Example 7.

DETAILED DESCRIPTION OF THE
INVENTION

Two aspects of the separator according to the present invention will now be described, but the present invention is not limited thereto.

First Aspect

In the first aspect, the separator of the present invention comprises a porous base material containing polyolefin, and a porous layer containing a vinylidene fluoride resin as a main component provided on at least one surface of the porous base material, wherein the porous layer contains at least one vinylidene fluoride resin having a weight-average molecular weight of 150,000 to 500,000 in an amount of 50% by weight or more based on the overall vinylidene fluoride resin.

The porous layer containing a vinylidene fluoride resin in the separator of the first aspect preferably has an average pore diameter within a range from 0.01 to 10 μm. When the average pore size is too small, transfer of the electrolytic solution is obstructed and the ionic conductivity decreases. On the other hand, when the average pore size is too large, the mechanical strength is reduced and a porous structure of the vinylidene fluoride resin swollen with the electrolytic solution is broken, unfavorably.

The thickness of the porous layer containing a vinylidene fluoride resin is not specifically limited, but is most preferably from 0.1 to 5 μm in view of the ionic conductivity. It is also preferable in the case of reduction in thickness of the lithium ion battery. When the thickness of the porous layer is less than 0.1 μm, adhesion and bondability to a positive electrode base material or a negative electrode base material deteriorate, unfavorably. To improve the bondability and adhesion, the porous layer preferably has larger thickness. Since the separator for lithium ion secondary battery of the second aspect can be firmly bonded with electrode base materials even when the porous layer has a thickness of 5 μm or less, the thickness of the porous layer is preferably controlled to 5 μm or less in view of reduction in thickness of the lithium ion battery. The thickness is most preferably from 0.1 μm to 1 μm. In this case, the ionic conductivity is further improved.

Furthermore, a lithium ion secondary battery, which is obtained by disposing the separator of the first aspect between a positive electrode obtained by bonding a positive electrode active material to a positive electrode current collector, and a negative electrode obtained by bonding a negative electrode active material to a negative electrode current collector, and holding an electrolytic solution containing lithium ions in the separator, is excellent in capacity characteristics, charge and discharge characteristics, cycle characteristics and safety.

The separator of the first aspect comprises a porous base material containing polyolefin, and a porous layer containing a vinylidene fluoride resin as a main component provided on at least one surface of the porous base material. In this respect, the separator is essentially different from the separator wherein the polyolefin porous film is filled with the vinylidene fluoride resin disclosed in the aforementioned Japanese Patent Application, First Publication No. 2001-176482. It is important so as not to obstruct shutdown performances of polyolefin porous base material that the polyolefin porous base material is not filled with the vinylidene fluoride resin. Since the surface of the polyolefin porous base material is uniformly coated with the porous layer containing the vinylidene fluoride resin of the separator of the first aspect, it is possible to avoid the problem of the separator comprising a scattered polymer layer described in the aforementioned Japanese Patent Application, First Publication No. 2001-118558. Also, a porous structure of the vinylidene fluoride resin formed on the surface makes it possible to easily incorporate the electrolytic solution into the polyolefin porous base material and vinylidene fluoride resin layer thereby to exhibit electrolytic solution retention properties, and to improve the ionic conductivity. Furthermore, the presence of the vinylidene fluoride resin having good adhesion and bondability to the positive electrode base material or negative electrode base material not only improves the ionic conductivity and reduces internal resistance, but also prevents delamination between electrodes from occurring during evolution of a gas in the battery, thus making it possible to improve cycle life of the lithium ion secondary battery.

Second Aspect

In the second aspect, the separator of the present invention comprises a porous base material containing polyolefin, and a porous layer containing a vinylidene fluoride resin as a main component provided on at least one surface of the porous base material, wherein the average pore size of the external surface is less than that of the interior in the porous layer. The external surface preferably has an average pore size of 0.1 to 5 μm and the interior of the porous layer preferably has an average pore size of 0.5 to 10 μm in the porous layer.

The average pore size of the external surface is determined by observing the external surface of the porous layer using SEM, measuring the pore size of at least 20 holes selected at random and averaging the measured values. The average pore size of the interior is determined by observing a longitudinal cross section of the porous layer using SEM, selecting at last 20 holes, which are not exposed to the external surface, at random, measuring the pore size of the holes and averaging the measured values. The term "pore size" as used herein refers to a major axis in the case in which the pore is not generally circular, but is generally oval.

The external surface of the porous layer is a portion which is closely contacted with electrodes when using the separator in the battery. Therefore, when the average pore size is too large, the contact area between the vinylidene fluoride resin and electrodes decreases and adhesion and bondability to electrodes deteriorate. On the other hand, when the average pore size is too small, it becomes difficult to permeate the electrolytic solution and the ionic conductivity decreases. Therefore, when the average pore size of the external surface is controlled within a range from 0.1 to 5 µm, adhesion to the electrode can be secured and it becomes possible to sufficiently permeate the electrolytic solution. The particle size of the electrode active material used in the positive electrode and the negative electrode varies, but is usually 5 µm or greater. In this respect, when the pore size of the external surface is 5 µm or less, it is possible to prevent local short-circuiting due to contamination with the electrode active material in the porous layer when the separator is bonded with electrodes. When the average pore size of the external surface is within the above range, when electrodes are bonded with the external surface, pores of the external surface cover unevenness of the surface of electrodes and thus electrodes can be closely contacted with the separator while decreasing irregular thickness in a positive electrode/separator/negative electrode assembly after bonding with electrodes.

It is important that the average pore size of the interior of the porous layer be selected so that the strength of the porous layer can be maintained while preventing leakage of the electrolytic solution and securing the amount of the electrolytic solution to be held and freedom of transfer of the electrolytic solution, and the average pore size is preferably within a range from 0.5 to 10 µm. When the average pore size is less than 0.5 µm, the amount of the electrolytic solution, which can be held, decreases and freedom of transfer of the electrolytic solution also decreases and, therefore, the ionic conductivity decreases. On the other hand, when the average pore size is greater than 10 µm, the strength of the porous layer decreases and the structure is hardly maintained and. moreover, intrinsic affinity with the electrolytic solution of the vinylidene fluoride resin is not sufficiently exhibited and the electrolytic solution is liable to leak through the porous layer. The average pore size is preferably within a range from 0.5 to 5 µm.

The average pore sizes of the external surface and interior of the porous layer are controlled so that the average pore size of the external surface is less than that of the interior. When the pore size of the external surface is less than that of the interior, the electrolytic solution held in pores by a weak interaction with a pore wall made of the vinylidene fluoride resin is liable to be stably held in the pores and leakage of the electrolytic solution scarcely occurs.

As described above, when the pore size of the external surface of the porous layer is made to be different from that of the interior and both pore sizes are controlled to a specific relationship, it is made possible to obtain a separator which is excellent in electrolytic solution permeability, and can suppress leakage of the electrolytic solution and firmly maintain adhesion to electrodes.

In the separator of the second aspect, the thickness of the porous layer is not specifically limited, but is preferably from 0.5 to 8 µm in view of ionic conductivity, adhesion to electrodes and reduction in thickness of the battery. When the thickness is less than 0.5 µm, adhesion to electrodes tends to deteriorate. The thickness is more preferably from 0.5 to 5 µm, and more preferably 0.5 to 1.5 µm. When the thickness is within the above range, the ionic conductivity is further improved.

Since the separator of the second aspect is provided with a porous base material containing polyolefin, it is excellent in dimensional stability and heat resistance, and also exhibits shutdown characteristics and is excellent in safety when the interior of the lithium ion secondary battery provided with the separator is heated due to overcharging or an abnormal short-circuited state. Since the porous layer containing a vinylidene fluoride resin as a main component is uniformly provided on at least one surface of the porous base material, this separator suppresses the occurrence of a difference in ionic conductivity in the battery and also suppresses the formation of local electrode dendrite and the occurrence of internal short-circuiting, and thus the separator is excellent in safety. Furthermore, since the average pore size of the external surface and that of the interior of the porous layer are specifically controlled, the separator of the second aspect is excellent in adhesion and bondability to electrodes and can reduce the interfacial resistance, and is also capable of closely contacting with the interface to electrodes even when a gas is evolved by the electrochemical reaction. The separator of the second aspect has good ionic conductivity because it is also excellent in electrolytic solution retention properties.

When the porous layer is formed in an amount of 0.5 to 10 g/m$^2$, adhesion between the separator and electrodes is particularly improved, thus making it possible to suppress deterioration of the ionic conductivity of the battery and to reduce the interfacial resistance.

The battery provided with the separator of the second aspect is excellent in capacity characteristics, charge and discharge characteristics, cycle characteristics, safety and reliability.

As described above, in the separator of the second aspect, since the porous layer containing a vinylidene fluoride resin as a main component is formed on at least one surface of the porous base material containing polyolefin, melting of polyolefin is not obstructed by the vinylidene fluoride resin and the separator sufficiently exhibit shutdown characteristics, unlike the separator described in the aforementioned Japanese Patent Application, First Publication No. 2001-176482. Since the porous layer uniformly covers the porous base material, variation in ionic conductivity does not occur and the formation of local electrode dendrite and the occurrence of internal short-circuiting can be avoided, unlike the separator described in Japanese Patent Application. First Publication No. 2001-118558.

In the separator of the second aspect, since the pore size of the porous layer is specifically controlled, the separator is excellent in electrolytic solution retention and ionic conductivity, and when bonded with electrodes, pores of the external surface cover unevenness of the surface of electrodes and thus electrodes can be closely contacted with the separator while decreasing irregular thickness in a positive electrode/separator/negative electrode assembly after bonding with electrodes. These excellent characteristics are important to uniformly perform the electrochemical reaction in the battery and serve as a factor to improve specification of the capacity of the battery, charge and discharge characteristics, cycle characteristics, safety and reliability.

Furthermore, excellent adhesion and bondability between the separator and electrodes improves the ionic conductivity and reduces the interfacial resistance, and also exerts the effect of suppressing delamination between electrodes, when a gas is evolved in the battery, and can improve cycle life of the battery.

The lithium ion secondary battery provided with the porous base material and the porous layer used in the separator of the present invention as well as the separator of the present invention will now be described.

Porous Base Material

The separator of the present invention comprises a porous base material containing polyolefin, and a porous layer containing a vinylidene fluoride resin as a main component provided on at least one surface of the porous base material.

The polyolefin is not specifically limited as long as it is electrochemically stable, and examples thereof include polyethylene, polypropylene, copolymer thereof, and a mixture thereof.

A film-like porous base material having a fine pore structure can be prepared by mixing organic or inorganic particles with the polyolefin, forming the mixture into a film. and extracting particles, followed by drying and further drawing. In the case of forming into a film, additives such as plasticizers may be added, if necessary.

The thickness of the porous base material containing polyolefin is not specifically limited, but is preferably 200 μm or less. When the thickness is larger than 200 μm, the thickness of the separator to be produced increases and, as a result, the distance between electrodes increases and the internal resistance tends to increase when the battery is provided with the separator. The thickness of the porous base material is more preferably from 5 to 50 μm. When the thickness of the porous base material is 50 μm or less, the thickness of the separator can be reduced and the thickness of the battery is also reduced. However, when the thickness of the porous base material is less than 5 μm, the strength decreases and the safety of the battery may become insufficient. Also, it becomes difficult to produce the separator, and the productivity of the separator and the battery decreases. From such a point of view, the thickness of the porous base material is preferably within a range from 10 to 25 μm, and most preferably from 15 to 25 μm. When the thickness of the porous base material is within the above range, the resulting battery is excellent in so-called shutdown characteristics wherein, when the interior of the battery is heated due to overcharging or an abnormal short-circuited state, the porous structure is converted into the non-porous structure by heat fusion, thereby terminating the reaction between electrodes and preventing ignition of the organic solvent in the electrolytic solution.

In the porous base material containing polyolefin, air permeability as measured by a Gurley air permeability tester is preferably 1000 sec/100 ml or less. As the measured air permeability decreases, the liquid permeability is improved and it is easy to transfer the electrolytic solution, and therefore the ionic conductivity is improved. When using a porous base material having such air permeability, the air permeability of the separator can be easily controlled to 1000 sec/100 ml or less even when the porous base material is provided with a porous layer containing a vinylidene fluoride resin as a main component, as described hereinafter, thus making it possible to obtain a separator having good ionic conductivity. In the case in which the porous base material containing polyolefin has such air permeability, the porous base material has a porosity within a range from 20 to 80% by volume.

Porous Layer

On at least one surface of the above porous base material containing polyolefin, a porous layer containing a vinylidene fluoride resin as a main component is formed. The vinylidene fluoride resin is preferable because it is electrochemically stable and has a sufficient potential window within an electrode potential of the battery.

When using a separator comprising a porous base material and a porous layer containing the vinylidene fluoride resin formed only on one surface of the porous base material as the separator in the battery, the surface on which the porous layer was formed may be either of surfaces of the positive electrode or negative electrode. However, the porous layer is preferably formed on both surfaces of the porous base material because bondability and adhesion between the separator, the positive electrode and the negative electrode are improved and the ionic conductivity is also improved.

The vinylidene fluoride resin used as a main component of the porous layer may be a homopolymer (polyvinylidene fluoride) of vinylidene fluoride alone, or a copolymer of at least one selected from the group consisting of ethylene tetrafluoride, propylene hexafluoride and ethylene, and vinylidene fluoride. These polymers are electrochemically stable and have sufficient potential window within an electrode potential of a lithium ion secondary battery. Therefore, these homopolymers or copolymers may be used alone, or it is possible to work the present invention by using a mixture of two or more kinds thereof. The polyvinylidene fluoride is particularly preferable because it has high heat resistance and the resulting separator holds the electrolytic solution and exhibits sufficient heat resistance even in a state of being accommodated in the battery.

On the other hand, since the copolymer of propylene hexafluoride and vinylidene fluoride has low melting point as compared with the homopolymer of vinylidene fluoride, it has an advantage in that it becomes easy to perform heat fusion and adhesion to the respective electrodes increases in the hot press process of bonding positive electrode or negative electrode in the case of producing a battery using the separator of the present invention for lithium ion secondary battery. In this case, the homopolymer of vinylidene fluoride is preferably used in combination with the copolymer of propylene hexafluoride and vinylidene fluoride, thereby making it possible to prevent deterioration of the heat resistance in a state of holding the electrolytic solution.

Although the copolymer ratio is not specifically limited, the copolymer to be used is preferably a copolymer wherein a ratio of a vinylidene fluoride compound monomer is 50% by weight or more taking account of the electrolytic solution resistance and heat resistance.

The molecular weight of the vinylidene fluoride resin to be used is not specifically limited, but a weight-average molecular weight is preferably within a range from 130,000 to 500,000. When the weight-average molecular weight is less than 130,000, the solvent resistance to the electrolytic solution is poor and the vinylidene fluoride resin partially dissolves in the solvent. As a result, a difference in ionic conductivity occurs in the battery and, therefore, local electrode dendrite and internal short-circuiting may occur. On the other hand, when the weight-average molecular weight exceeds 500,000, affinity between the vinylidene fluoride resin and the electrolytic solution becomes inferior and the vinylidene fluoride resin scarcely swell due to the electrolytic solution. Therefore, pores are merely filled with an electrolytic solution, like the polyolefin porous base material, and retention properties of the electrolytic solution deteriorate and cycle characteristics deteriorate. That is, only the outermost surface, which is contacted with the electrolytic solution, of the vinylidene fluoride resin impregnated with the electrolytic solution is preferably in a swollen state. Furthermore, when the weight-average molecular weight of the vinylidene fluoride resin is within a range from 150,000 to 500,000, and more preferably from 300,000 to 500,000, resistance to dissolution in the electrolytic solution of the vinylidene fluoride resin can be maintained and affinity with the electrolytic solution is excellent even when the battery is heated due to overcharging.

When using a mixture of the vinylidene fluoride resin, the mixture preferably contains 50% by weight or more of the vinylidene fluoride resin having a weight-average molecular weight of 150,000 to 500,000. When the amount of the vinylidene fluoride resin having a weight-average molecular weight of 150,000 to 500,000 is less than 50% by weight, the dissolution resistance is lowered by the existing resin having a molecular weight of less than 150,000, or retention properties of the electrolytic solution are lowered by the existing resin having a molecular weight of more than 500,000. The lower-molecular weight vinylidene fluoride resin having a weight-average molecular weight of less than 150,000 can be used in combination in an amount of less than 50% by weight based on the overall vinylidene fluoride resin because it has high affinity with the electrolytic solution and improves electrolytic solution retention properties.

The weight-average molecular weight of the vinylidene fluoride resin used in the present invention can be determined according to the following procedure using gel permeation chromatography (GPC). That is, the vinylidene fluoride resin is dissolved in the solvent in which the polymer dissolves, for example, solvents such as N,N-dimethylacetamide, N,N-dimethylformamide and 1-methyl-2-pyrrolidone in the present invention to obtain a sample. After a calibration curve is made by using a standard mixed solution of polystyrene having a known molecular weight as a standard sample, the molecular weight of the sample is measured and a relative molecular weight to polystyrene (molecular weight relative to polystyrene standards) is determined.

Such a vinylidene fluoride resin may be prepared in a uniform polymerization system by a known polymerization method such as emulsion polymerization method or suspension polymerization method under proper polymerization conditions. In particular, the emulsion polymerization method is preferable because it is excellent in economical efficiency and productivity. Specifically, the polymerization is carried out while heating under pressure using a redox catalyst comprising a water-soluble inorganic peroxide such as ammonium persulfate and a reducing agent, and using an emulsifier such as ammonium perfluorooctanoate, ammonium perfluoroheptanoate, or ammonium perfluorononaoate.

Examples of the method of forming the porous layer using the vinylidene fluoride resin include phase separation method, drying method, extraction method and foaming method.

When the porous layer is formed by the drying method, a solution or slurry is prepared by dissolving the vinylidene fluoride resin in a solvent and the resulting solution or slurry is applied on the surface of a release film composed of a polymer film subjected to a release treatment, followed by drying. In this case, a good solvent and a poor solvent of the vinylidene fluoride resin are used in combination as the solvent. As the poor solvent, a solvent having a higher boiling point than that of the good solvent is selected. When these solvents are selected and used in combination and a solution or slurry prepared by dissolving the vinylidene fluoride resin in the solvent is applied and dried, the good solvent is vaporized before vaporization of the poor solvent and the vinylidene fluoride resin having decreased solubility starts to deposit to form a porous structure having a porosity corresponding to the volume of the existing poor solvent. The pore size in the porous layer can be controlled to the desired pore size by appropriately adjusting a combination of the good solvent and the poor solvent, its ratio, a concentration of the vinylidene fluoride resin to be dissolved in the solvent, and drying conditions.

A porous layer was formed on the release film and a porous base material containing polyolefin was disposed on the porous layer and, after laminating them using a flat press or a laminator roll, the release film is removed, thereby making it possible to form the porous layer containing a vinylidene fluoride resin on the porous base material containing polyolefin.

In place of the formation of the porous layer using the release film, a porous layer may be formed by applying the solution of a slurry prepared by dissolving the vinylidene fluoride resin in the solvent directly on the surface of the porous base material. Also in this case, the pore size in the porous layer can be controlled to the desired pore size by appropriately adjusting a combination of the good solvent and the poor solvent, its ratio, a concentration of the vinylidene fluoride resin to be dissolved in the solvent, and drying conditions.

When the porous layer is formed by the extraction method, a solution prepared by dissolving the vinylidene fluoride resin in the good solvent is applied on the release film and, after dipping in the poor solvent of the vinylidene fluoride resin, the good solvent in the coated vinylidene fluoride resin is extracted and is replaced by the poor solvent, thereby to form a porous structure. In the same manner as in the case of the drying method, the porous layer is laminated on the porous base material containing polyolefin and the release film is removed to form a porous layer on the porous base material. Also in the case of the extraction method, the solution prepared by dissolving the vinylidene fluoride resin in the good solvent may be applied directly on the porous base material without using the release film and the resulting coated porous base material may be dipped in the poor solvent of the vinylidene fluoride resin.

The method of applying the solution or slurry on the release film or porous base material is not specifically limited and examples thereof include dip coating method, spray coating method, roll coating method, doctor blade method, gravure coating method and screen printing method.

Examples of the good solvent of the vinylidene fluoride resin include, but are not limited to, amide solvents such as 1-methyl-2-pyrrolidone (NMP), N,N-dimethylacetamide, and N,N-dimethylformamide; sulfone solvents such as dimethyl sulfoxide; ketone solvents such as 2-butanone and cyclohexanone; and ether solvents such as tetrahydrofuran. Examples of the poor solvent include, but are not limited to, alcohol solvents such as methanol, 1-hexanol, 1-heptanol, and 1-octanol; glycols such as ethylene glycol, propylene glycol, diethylene glycol, and glycerin; ether solvents such as methylcellosolve, ethylcellosolve, and butylcellosolve; carbonate ester solvents such as propylene carbonate, dimethyl carbonate, diethyl carbonate, and methyl carbonate; hydrocarbon solvents such as decane and dodecane; and phthalate ester solvents such as diethyl phthalate and dibutyl phthalate. In these good and poor solvents, two or more kinds thereof can be used in combination.

In the case in which the porous layer is formed on both surfaces of the porous base material containing polyolefin, the porous layer may be separately formed on one surface, or both surfaces may be coated simultaneously, or separately produced porous layers are simultaneously formed on both surfaces and then laminated using a flat press.

Such a porous layer is preferably formed in an amount of 0.5 to 10 g/m$^2$. In the case in which the porous layer is formed only on one surface of the porous base material, the porous layer is preferably formed on one surface in an amount within the above range. In the case in which the porous layer is formed on both surfaces, the porous layer is preferably formed on both surfaces in a total amount within the above range.

When the porous layer is formed in an amount of less than 0.5 g/m$^2$, the amount of the vinylidene fluoride resin contributing to adhesion to electrodes is very small and sufficient adhesion is sometimes not exhibited. When the porous layer is formed in an amount of 0.5 g/m$^2$ or more, sufficient adhesion is exhibited. Even when the porous layer is formed in an amount of more than 10 g/m$^2$, the adhesion is not further improved. Therefore, when the porous layer is formed in an amount of more than 10 g/m$^2$, the thickness of the porous layer increases and, therefore, it is disadvantageous to a reduction in thickness of the battery and the volume energy density decreases. The weight of the porous layer is preferably 0.5 to 10 g/m$^2$, and more preferably from 1 to 5 g/m$^2$. When the porous layer is formed in an amount within the above range, it is possible to obtain a separator which can provide a battery having excellent balance between various performances.

As long as the porous layer contains the vinylidene fluoride resin as a main component, electrochemically stable particles or fibrous articles may be added in the porous layer, thereby to improve mechanical strength and dimensional stability of the porous layer. Examples of these particles include inorganic particles made of silicon oxide, aluminum oxide, titanium oxide, and magnesium oxide; and organic particles made of phenol resin, polyimide resin, benzoguanamine resin, melamine resin, polyolefin resin, and fluororesin. Examples of the fibrous article include inorganic fibrous articles such as apatite fiber, titanium oxide fiber, and whiskers of metal oxide; and organic fibrous articles such as aramid fibers and polybenzoxazole fibers. The shape and particle size of these particles and fibrous articles are not specifically limited and these particles and fibrous articles can be appropriately selected and used. These particles and fibrous articles may be added in the solution or slurry to be applied in the case of forming the porous layer using the drying method or extraction method, as described above.

When the porous layer having a specific pore size is formed on the porous base material containing, there can be easily produced a separator wherein air permeability as measured by a Gurley air permeability tester of the porous base material is 1000 sec/100 ml or less. When the air permeability exceeds 1000 sec/100 ml, the ionic conductivity tends to decrease. A separator having excellent ionic conductivity can be obtained by controlling the air permeability within a range from 500 sec/100 ml, and preferably from 1 to 200 sec/100 ml.

Lithium Ion Secondary Battery

The lithium ion secondary battery provided with the separator described above (hereinafter abbreviated to "battery") will now be described.

The structure of the battery is not specifically limited and examples of the battery include multi-layer and tubular batteries comprising a positive electrode, a negative electrode and a separator.

As the positive electrode and negative electrode, an electrode active material is used. Examples of a positive electrode active material of the battery include composite oxide represented by the composition formula: $Li_xM_2O_2$ or $Li_yM_2O_2$ (M represents a transition metal, $0 \leq x \leq 1$, $0 \leq y \leq 2$), oxide having tunnel-like pores and layer-structure metallic chalcogen compounds, and specific examples thereof include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$ and $TiS_2$. Examples of the organic compound include conductive polymers such as polyaniline, polyacene and polypyrrole. Regardless of the inorganic compound and the organic compound, these various active materials may be used in combination.

As the negative electrode active material of the battery, for example, there can be used substances capable of occluding and releasing lithium and/or lithium ions, such as carbon material, graphite and coke; alloys of Al, Si, Pb, Sn, Zn and Cd, and lithium; transition metal composite oxides such as $LiFe_2O_3$; transition metal oxides such as $WO_2$ and $MoO_2$; carbonaceous materials such as graphite and carbon; lithium nitrides such as $Li_5(Li_3N)$; and lithium metal such as lithium metal foil, or a mixture thereof.

Examples of particularly preferable negative electrode active material include carbon material, lithium metal, lithium alloy, and oxide material, and examples of the positive electrode active material include oxide or carbon material which can be formed by intercalating or deintercalating lithium ions. A battery having good characteristics can be obtained by using electrodes using these active materials.

Specific examples of the carbon material may be appropriately selected from mesophase carbon black, mesocarbon microbeads, natural or artificial graphite. resin-fired carbon material, carbon black, and carbon fiber. These carbon materials are used in the form of powders. Among these carbon materials, graphite and mesophase carbon black are preferable and the average particle size is preferably within a range from 1 to 30 μm, and particularly preferably from 5 to 25 μm. When the average particle size is much smaller than the above range, charge and discharge cycle life is shortened and the capacity tends to vary drastically. On the other hand, the average particle size is much larger than the above range, the capacity tends to vary drastically and the average capacity decreases. The reason the capacity varies when the average particle size is large is believed to be that contact between graphite and the current collector or contact between graphites are not uniform and vary.

The oxide or carbon material, which can be formed by intercalating or deintercalating lithium ions, is preferably a composite oxide containing lithium and examples thereof include $LiCoO_2$, $LiNiO_2$, $LiMnO_4$ and $LiV_2O_4$. These oxides are used in the form of powders and the powders preferably have an average particle size of 1 to 40 μm.

If necessary, conductive auxiliary agents are added to electrodes. Examples of preferable conductive auxiliary agent include graphite, carbon black, acetylene black and carbon fiber, and metals such as nickel, aluminum, copper and silver. Among these conductive auxiliary agents, graphite and carbon are particularly preferable. Examples of the binder used to form electrodes include fluororesin and fluorinated rubber. The amount of the binder is preferably within a range from about 3 to 30% by weight based on electrodes.

In the production of the battery, first, an electrode active material and an optionally added conductive auxiliary agent are dispersed in a gel electrolytic solution or a binder solution to prepare an electrode coating solution and then the resulting electrode coating solution is applied on a current collector. The current collector may be appropriately selected from known current collectors according to the shape of a device provided with the battery and the method of disposing in a casing. Usually, aluminum is used as the positive electrode, while copper and nickel are used as the negative electrode.

After applying the electrode coating solution on the current collector, the solvent is vaporized to obtain a positive electrode and a negative electrode wherein an active material layer is formed on the current collector, respectively. The thickness of the layer of the electrode coating solution is preferably from about 50 to 400 µm.

An electronic element assembly is made by laminating positive and negative electrodes thus obtained and the above-mentioned separator in the sequence of the positive electrode, the separator and the negative electrode and contact-bonding the laminate, and then a sheathing material is packed with the electronic element assembly. In the case of lamination, the separator and electrode are disposed so that the surface of the active material of electrodes is contacted with the separator. In the case of contact bonding, the separator may be previously impregnated with the electrolytic solution, or electrolytic solution may be filled therein after packing the sheathing material with the electronic element assembly. The sheathing material is sealed after appropriately connecting an electrode terminal and a safety device.

As the electrolytic solution, a mixed solution prepared by dissolving an electrolyte salt in an organic solvent is used. Preferably, the organic solvent is not decomposed when subjected to high voltage, and examples thereof include polar solvents such as ethylene carbonate, propylene carbonate, dimethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran. dioxolane, and methyl acetate, and mixtures of two or more kinds thereof.

As the electrolyte salt to be dissolved in the electrolytic solution, there can be used salts containing lithium such as $LiClO_4$, $LiPF_6$, $LiBF_4$, $LiAsF_6$, $LiCF_6$, $LiCF_3CO_2$, $LiPF_6SO_3$, $LiN(SO_3CF_3)_2$, $Li(SO_2CF_2CF_3)_2$, $LiN(COCF_3)_2$, and $LiN(COCF_2CF_3)_2$, and mixtures of two or more kinds thereof in the case of the lithium ion secondary battery.

EXAMPLES

The following Examples further illustrate the present invention in detail.

Examples 1 to 6

As the vinylidene fluoride resin, a homopolymer of vinylidene fluoride having a weight-average molecular weight (hereinafter abbreviated to Mw) of about 130,000, a homopolymer of vinylidene fluoride having an Mw of about 300,000, a homopolymer of vinylidene fluoride having Mw of about 400,000, and a copolymer (monomer ratio of HFP: about 12% by weight, Mw: about 270,000) of propylene hexafluoride (hereinafter abbreviated to HFP) and vinylidene fluoride were used. Such a vinylidene fluoride resin was added to 1-methyl-2-pyrrolidone (hereinafter abbreviated to NMP) in the amounts described in Table 1, and then dissolved at room temperature in a nitrogen atmosphere. After cooling to room temperature, a coating solution of the mixture was obtained. After casting the resulting coating solution on one surface of a polyethylene drawn porous film (porous base material) having a thickness of about 25 µm and air permeability of about 100 sec/100 ml by a doctor blade method, the coated porous film was dipped in methanol for 10 minutes. The resulting coating film was drawn up from methanol and then dried in a dryer at 40° C. to obtain separators for lithium ion secondary battery, comprising a polyethylene drawn porous film and a porous layer containing a vinylidene fluoride resin provided on one surface of the polyethylene drawn porous film of Examples 1 to 6 of the present invention. In Example 2 to 6, another uncoated surface was subjected to a coating treatment to obtain separators for lithium ion secondary battery, comprising a polyethylene drawn porous film and a porous layer containing a vinylidene fluoride resin provided on both surfaces of the polyethylene drawn porous film.

TABLE 1

| | Composition of vinylidene fluoride resin (% by weight) | | | | |
|---|---|---|---|---|---|
| | Homopolymer | | | Copolymer | |
| | | | | HFP: 12% | HFP: 15% |
| | Mw: 130,000 | Mw: 300,000 | Mw: 400,000 | by weight Mw: 270,000 | by weight Mw: 100,000 |
| Example 1 | — | — | 100 | — | — |
| Example 2 | — | — | 60 | 40 | — |
| Example 3 | — | 100 | — | — | — |
| Example 4 | — | 60 | 40 | — | — |
| Example 5 | — | 60 | — | 40 | — |
| Example 6 | 40 | 60 | — | — | — |
| Reference Example 1 | 100 | — | — | — | — |
| Reference Example 2 | 60 | 40 | — | — | — |
| Reference Example 3 | — | 40 | — | — | 60 |

Reference Examples 1 to 3

As the vinylidene fluoride resin, a homopolymer of vinylidene fluoride having an Mw of about 130,000, a homopolymer of vinylidene fluoride having an Mw of about 300,000, and a copolymer (monomer ratio of HFP: about 15% by weight, Mw: about 100,000) of HFP and vinylidene fluoride were used. According to the formulation shown in Table 1, separators for lithium ion secondary battery, comprising a polyethylene drawn porous film and a porous layer containing a vinylidene fluoride resin provided on both surfaces of the polyethylene drawn porous film were obtained in the same manner as in Examples 2 to 6.

Comparative Example 1

A homopolymer of vinylidene fluoride having an Mw of about 130,000 was dissolved in an NMP solution to obtain a solution for impregnation. A polyethylene drawn porous film having a thickness of about 25 µm and air permeability of about 100 sec/100 ml was dipped in the solution and vacuum impregnation was carried out. After drawing up the resulting film, NMP was evaporated to obtain a separator wherein pores of a polyethylene drawn porous film are filled with a vinylidene fluoride resin.

Comparative Example 2

A polyethylene drawn porous film having a thickness of about 25 μm and air permeability of about 100 sec/100 ml, which does not have a porous layer containing a vinylidene fluoride resin, was used as a separator.

The separators obtained in Examples 1 to 6, Reference Examples 1 to 3 and Comparative Examples 1 to 2 were evaluated in the following manner.

<Physical Properties of Separator>

The thickness of each porous layer of the separators for lithium ion secondary battery obtained above was measured and air permeability was measured by an air permeability tester. Each of the resulting separators for lithium ion secondary battery was cut to obtain a specimen in a size of 4 cm×5 cm and, after interposing the specimen between two glass plates, the resulting laminate was heated at 150° C.; for 10 minutes and a dimensional change was measured. Furthermore, air permeability of the separator subjected to a heat treatment was determined and shutdown performances upon heating were evaluated. These results are shown in Table 2.

In Table 2, "layer thickness" denotes "thickness of one surface (first lamination surface)/thickness of another surface (second lamination surface)" and air permeability denotes a value as measured by an Oken-type air permeability tester. A dimension retention ratio was calculated by the following equation:

Dimension retention ratio (%)=$X/Y$×100 where Y denotes an area of a specimen before the heat treatment and X denotes an area of a specimen after the heat treatment.

Furthermore, shutdown performances were evaluated according to the following criteria.

A (excellent): air permeability after the heat treatment is 100,000 sec/100 ml or more and dimension retention ratio is 80% or more B (ordinary): air permeability after the heat treatment is 100,000 sec/100 ml or more and dimension retention ratio is less than 80%

C (poor): air permeability after the heat treatment is less than 100,000 sec/100 ml

TABLE 2

| | Physical properties of separator for lithium ion secondary battery | | | |
|---|---|---|---|---|
| | Before heat treatment | | After heat treatment at 150° C. | |
| | Layer thickness (μm) | Air permeability (sec/100 ml) | Dimension retention ratio (%) | Shutdown performances |
| Example 1 | 10.0/0.0 | 950 | 76 | A |
| Example 2 | 5.0/5.0 | 250 | 92 | A |
| Example 3 | 2.5/2.5 | 230 | 98 | A |
| Example 4 | 1.0/1.0 | 160 | 96 | A |
| Example 5 | 0.5/0.5 | 140 | 90 | A |
| Example 6 | 0.2/0.2 | 130 | 90 | A |
| Reference Example 1 | 2.5/2.5 | 240 | 95 | A |
| Reference Example 2 | 2.5/2.5 | 250 | 97 | A |
| Reference Example 3 | 2.5/2.5 | 240 | 91 | A |
| Comparative Example 1 | — | 11000 | 64 | C |
| Comparative Example 2 | — | 100 | 60 | B |

As is apparent from the results of Table 2, the separators of Examples 1 to 6 exhibit low air permeability and these separators exhibiting low air permeability are excellent in electrolytic solution permeability. Therefore, it is easy to impregnate during the injection of the electrolytic solution and the impregnation amount can be increased and, furthermore, it becomes easy to move the electrolytic solution, thus making it possible to exhibit high ionic conductivity. On the other hand, the separator of Comparative Example 1 exhibits high air permeability and the separator exhibiting high air permeability is poor in electrolytic solution permeability and high ionic conductivity is hardly obtained. The separators of Examples 1 to 6 and Reference Examples 1 to 3 have high dimension retention properties in a dimensional change during the heat treatment because the vinylidene fluoride resin existing on the surface of the separator exhibited good adhesion and bondability to the glass substrate. This is important so as to exhibit the same effect in adhesion and bondability to electrodes for secondary battery and to maintain insulating properties between electrodes in the case in which the secondary battery causes abnormal temperature rise, and thus the safety is further improved. The separators of Examples 1 to 6 and Reference Examples 1 to 3 maintains shutdown properties (properties capable of exhibiting high insulating properties after a porous structure disappeared when melted at high temperature) of the polyethylene drawn porous film and exhibits high adhesion to electrodes and. therefore, they are excellent in shutdown properties with higher insulating reliability. On the other hand, the separators of Comparative Examples 1 and 2 are insufficient in dimension retention ratio during heating and shutdown properties as compared with the separators of Examples 1 to 6 and Reference Examples 1 to 3, and are inferior in safety of the secondary battery.

<Electrochemical Characteristics>

The porous layer of the separator for lithium ion secondary battery was impregnated with an electrolytic solution prepared by dissolving 1M LiPF$_6$ in ethylene carbonate (EC) and propylene carbonate (PC) (volume ratio EC/PC=1/2). Furthermore, a separator containing this electrolytic solution was interposed between two stainless steel electrodes and the ionic conductivity at 25° C. was measured by an AC impedance method. The measurement was carried out in a glove box filled with an argon gas. The separator containing an electrolytic solution obtained by the same manner as described above was transferred into a sealable container and, after storage in a high-temperature bath at 80° C. for 10 days, a change in weight was measured. Furthermore, the ionic conductivity of the separator after storage was measured in the same manner as described above. These results are shown in Table 3.

In Table 3, the ionic conductivity was measured by an AC impedance method. Also, a dimension retention ratio and a weight retention ratio were calculated by the following equations, respectively.

Dimension retention ratio (%)=α/β×100 where β denotes an area of a specimen after storage and α denotes an area of a specimen before storage Weight retention ratio (%)=γ/δ×100 where δ denotes a weight of a specimen before storage and γ denotes a weight of a specimen after storage

TABLE 3

| | Electrochemical characteristics | | | |
| --- | --- | --- | --- | --- |
| | Before storage | After storage at 80° C. | | |
| | Ionic conductivity (S/cm) | Dimension retention ratio (%) | Weight retention ratio (%) | Ionic conductivity (S/cm) |
| Example 1 | $8.6 \times 10^{-4}$ | 98 | 99 | $8.3 \times 10^{-4}$ |
| Example 2 | $1.3 \times 10^{-3}$ | 99 | 100 | $1.0 \times 10^{-3}$ |
| Example 3 | $3.3 \times 10^{-3}$ | 100 | 99 | $4.2 \times 10^{-3}$ |
| Example 4 | $8.9 \times 10^{-3}$ | 99 | 99 | $6.9 \times 10^{-3}$ |
| Example 5 | $1.0 \times 10^{-2}$ | 100 | 100 | $9.5 \times 10^{-3}$ |
| Example 6 | $2.1 \times 10^{-2}$ | 100 | 98 | $1.3 \times 10^{-2}$ |
| Reference Example 1 | $2.8 \times 10^{-3}$ | 100 | 86 | $2.0 \times 10^{-4}$ |
| Reference Example 2 | $3.2 \times 10^{-3}$ | 99 | 90 | $2.6 \times 10^{-4}$ |
| Reference Example 3 | $1.4 \times 10^{-3}$ | 99 | 88 | $1.5 \times 10^{-4}$ |
| Comparative Example 1 | $2.2 \times 10^{-4}$ | 98 | 87 | $1.6 \times 10^{-4}$ |
| Comparative Example 2 | $1.6 \times 10^{-5}$ | 100 | 92 | $1.4 \times 10^{-5}$ |

The results shown in Table 3 are evaluation results of electrochemical characteristics which are measures of capacity characteristics, cycle characteristics, charge and discharge characteristics of the secondary battery, and revealed that the secondary batteries of the Examples have sufficient performances suited for use as the secondary battery. Excellent secondary batteries can be produced because the separators of Examples 4 to 6 have high ionic conductivity. In an accelerated test performed on the assumption of long-term service, as a result of a comparison between the separators of the respective Examples and the separators of the respective Reference Examples and Comparative Examples after storage at 80° C., all separators exhibited satisfactory dimension retention ratio and the separators of the Examples exhibited nearly 100% of the weight retention ratio within measurement error, while the separators of Reference Examples 1 to 3 and Comparative Example 1 exhibited weight reduction.

This means that the vinylidene fluoride resin used dissolves slightly by corrosion with the electrolytic solution for a long time. The reason weight reduction is confirmed in Comparative Example 2 is considered as follows. That is, the electrolytic solution oozes out because of poor retention properties of the electrolytic solution with which the separator is impregnated. Consequently, the ionic conductivity after storage nearly maintained an initial value in the Examples, while a decrease from the initial value was confirmed in Reference Examples 1 to 3.

As is apparent from the results shown in Table 2 and Table 3, the separators of Examples 1 to 6 reconcile satisfactory physical properties and electrochemical characteristics.

Example 7

(Production of Separator)

Using a polyethylene porous film having a thickness of 25 μm and air permeability of about 100 sec/100 ml as the porous base material, a porous layer containing a vinylidene fluoride resin as a main component was formed on the porous base material in the following manner.

First, 10 parts by weight of polyvinylidene fluoride (PFVd) having a weight-average molecular weight of about 130,000 and 100 parts by weight of 1-methyl-2-pyrrolidone (NMP) were mixed and the resulting mixed solution was applied on one surface of the polyethylene porous base material, and then the coated polyethylene porous base material was dipped in methanol. The porous base material was sufficiently dipped, drawn up and then dried at room temperature to form a porous layer made of PFVd on one surface of the polyethylene porous base material, and thus a separator was obtained.

<Measurement and Evaluation of Various Physical Properties of Separator>

(1) Pore Size of Porous Layer

The thickness of the porous layer in the resulting separator was 8 μm.

Figure 2:
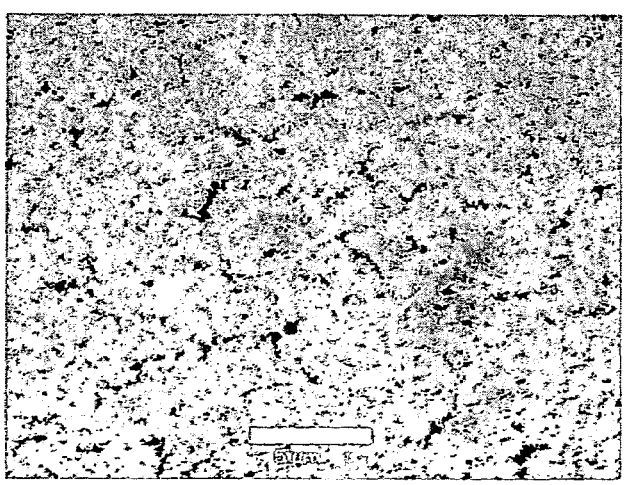
FIG. 2 is a SEM micrograph showing an external surface (porous layer) of a separator obtained in Example 7.

FIG. 1 and FIG. 2 are SEM micrographs, each showing a cross section and an external surface of the separator. To measure the pore size of the interior of the porous layer, 20 pores, which are not exposed to the external surface, were selected at random from the SEM micrograph showing the cross section (FIG. 1) and each pore size was measured, and then an average of the measured values was determined. As a result, the pore size of the interior was 6.3 μm on average and was at least 3.5 μm. To measure the pore size of the external surface of the porous layer, 20 pores were selected at random from the SEM micrograph showing the external surface (FIG. 2) and each pore size was measured, and then an average of the measured values was determined. As a result, the pore size of the interior was 2.2 μm on average and was at least 2.5 μm. The term "pore size" as used herein refers to a major axis in the case in which the pore is not generally circular, but is generally oval.

(2) Air Permeability of Separator

Air permeability, weight per 1 m$^2$ of the porous layer (PFVd), an impregnation ratio and a retention ratio of the electrolytic solution, and ionic conductivity of the resulting separator were evaluated.

The air permeability was measured by using Gurley Densometer, Model B. manufactured by YASUDA SEIKI CO., LTD.

The impregnation ratio and the retention ratio of the electrolytic solution were determined in the following manners. That is, an electrolytic solution was prepared by dissolving 1 mol/l of LiPF$_6$ in a mixed solvent of ethylene carbonate and dimethyl carbonate at a mixing ratio of 1:1 and a separator was dipped in the electrolytic solution under a vacuum and then drawn up from the solvent. After carefully wiping off the solvent adhered on the surface, the impregnation ratio of the electrolytic solution was measured.

After the separator containing the electrolytic solution was allowed to stand at an ambient temperature of 80° C. for 10 days, electrolytic solution retention properties were determined by weight measurement.

The ionic conductivity of the separator impregnated with electrolytic solution was measured by using an AC impedance method. In this case, a stainless steel electrode was used as the electrode.

The resulting various physical properties of the separator are shown in Table 4.

Example 8

In the same manner as in Example 7, except that a porous layer made of PFVd was separately formed on both surfaces of the polyethylene porous base material, a separator with the porous layer formed on both surfaces was obtained. The resulting various physical properties of the separator were measured and evaluated in the same manner as in Example 7. The results are shown in Table 4.

Example 9

In the same manner as in Example 8, except 12 parts by weight of PFVd having a weight-average molecular weight of about 300,000 was used as PFVd constituting the porous layer, a separator with the porous layer formed on both surfaces was obtained. The resulting various physical properties of the separator were measured and evaluated in the same manner as in Example 7. The results are shown in Table 4.

Example 10

In the same manner as in Example 8, except 12 parts by weight of a vinylidene fluoride-hexafluoropropylene copolymer having a weight-average molecular weight of about 270,000 was used as the vinylidene fluoride resin, a separator with the porous layer formed on both surfaces was obtained. The resulting various physical properties of the separator were measured and evaluated in the same manner as in Example 7. The results are shown in Table 4.

Comparative Example 3

The polyethylene porous base material used in Example 7 was used as the separator without forming the porous layer, and various physical properties thereof were evaluated in the same manner as in Example 7. The results are shown in Table 4.

Comparative Example 4

10 parts by weight of PFVd having a weight-average molecular weight of about 130,000 and 100 parts by weight of 1-methyl-2-pyrrolidone (NMP) were mixed and a polyethylene porous base material having a thickness of 25 µm and air permeability of about 100 sec/100 ml was impregnated with the mixed solution. The polyethylene porous base material was taken out from the mixed solution and then dried at 60° C. to obtain a separator comprising a polyethylene porous base material and a poreless PFVd resin layer formed on both surfaces of the polyethylene porous base material. Various physical properties of the resulting separator were measured and evaluated in the same manner as in Example 7. The results are shown in Table 4. Various physical properties are shown in Table 4.

Comparative Example 5

10 parts by weight of PFVd having a weight-average molecular weight of about 130,000, 100 parts by weight of N,N-dimethylacetamide and 4 parts by weight of dibutyl phthalate were mixed and a polyethylene porous base material having a thickness of 25 µm and air permeability of about 100 sec/100 ml was impregnated with the mixed solution. The polyethylene porous base material was taken out from the mixed solution and then dried at 60° C. overnight to obtain a separator comprising a polyethylene porous base material and a porous layer containing a vinylidene fluoride resin as a main component formed on both surfaces of the polyethylene porous base material. Various physical properties of the resulting separator were measured and evaluated in the same manner as in Example 7. The results are shown in Table 4. Various physical properties are shown in Table 4.

Comparative Example 6

10 parts by weight of PFVd having a weight-average molecular weight of about 130,000, 100 parts by weight of N,N-dimethylacetamide and 1 part by weight of dibutyl phthalate were mixed and a polyethylene porous base material having a thickness of 25 µm and air permeability of about 100 sec/100 ml was impregnated with the mixed solution. The polyethylene porous base material was taken out from the mixed solution and then dried at 60° C. overnight to obtain a separator comprising a polyethylene porous base material and a porous layer containing a vinylidene fluoride resin as a main component formed on both surfaces of the polyethylene porous base material. Various physical properties of the resulting separator were measured and evaluated in the same manner as in Example 7. The results are shown in Table 4. Various physical properties are shown in Table 4.

TABLE 4

| | Thickness of porous layer[1] µm | Average pore size of interior µm | Average pore size of external surface µm | Air permeability sec/100 ml | Weight of porous layer g/m² | Impregnation ratio of electrolytic solution[2] % by weight | Retention properties of electrolytic solution[3] % by weight | Ionic conductivity (25° C.) S/cm |
|---|---|---|---|---|---|---|---|---|
| Example 7 | 8/— | 6.3 | 2.2 | 270 | 3.9 | 66 | 62 | $1.8 \times 10^{-3}$ |
| Example 8 | 4/4 | 3.3 | 1.7 | 240 | 4.2 | 74 | 71 | $3.3 \times 10^{-3}$ |
| Example 9 | 2/2 | 2.3 | 1.1 | 180 | 2.6 | 63 | 62 | $3.4 \times 10^{-3}$ |
| Example 10 | 1.5/1.5 | 0.9 | 0.5 | 145 | 1.7 | 52 | 49 | $2.1 \times 10^{-3}$ |
| Comparative Example 3 | —/— | — | — | 100 | — | 0 | — | — |

TABLE 4-continued

|  | Thickness of porous layer[1] μm | Average pore size of interior μm | Average pore size of external surface μm | Air permeability sec/100 ml | Weight of porous layer g/m² | Impregnation ratio of electrolytic solution[2] % by weight | Retention properties of electrolytic solution[3] % by weight | Ionic conductivity (25° C.) S/cm |
|---|---|---|---|---|---|---|---|---|
| Comparative Example 4 | (1/1) | — | — | ∞ | (4.0) | 0 | — | — |
| Comparative Example 5 | 1/1 | 2.1 | 5.8 | 160 | 1.7 | 48 | 31 | $9.7 \times 10^{-4}$ |
| Comparative Example 6 | 0.5/0.5 | 0.1 | 0.5 | 75000 | 1.8 | 9 | 5 | $3.4 \times 10^{-4}$ |

[1]thickness of one surface/thickness of another surface
[2](weight of separator after impregnation − weight of separator before impregnation)/weight of separator after impregnation × 100(%)
[3](weight of separator before standing − weight of separator after standing)/weight of separator before standing × 100(%)

As is apparent from the results of Table 4, the separators produced in Examples 7 to 10 were excellent in impregnation ratio of the electrolytic solution and also excellent in retention properties.

On the other hand, it was difficult for the separators of Comparative Examples 3 and 4 to hold the electrolytic solution by impregnation, while the separators of Comparative Example 5 and 6 were insufficient in impregnation ratio and retention ratio.

Therefore, the separators of Examples 7 to 10 exhibit high ionic conductivity suited for use as the battery, for example, $10^{-3}$ S/cm or more, while the separators of Comparative Examples 3 to 6 did not exhibit ionic conductivity suited for practical use.

Then, simple test cells were produced by using the separators obtained in Examples 7 to 10 and Comparative Examples 3 to 6 and battery characteristics were evaluated.

Example 11

(Production of Positive Electrode)

A coating solution prepared by mixing and dispersing 100 parts by weight of lithium cobaltate ($LiCoO_2$) as an active material, 5 parts by weight of acetylene black as a conductive auxiliary agent, 10 parts by weight of a vinylidene fluoride-hexafluoropropylene copolymer as a binder, 100 parts by weight of N,N-dimethylacetamide and 30 parts by weight of dibutyl phthalate was applied on an aluminum foil having a thickness of 40 μm so as to adjust the film obtained after drying to 200 μm, and then dried at 150° C. After pressing using a hot roll, a positive electrode was obtained. The positive electrode has a total thickness of about 150 μm.

(Production of Negative Electrode)

A coating solution prepared by mixing and dispersing 100 parts by weight of mesophase carbon black as an active material, 5 parts by weight of acetylene black as a conductive auxiliary agent, 20 parts by weight of a vinylidene fluoride-hexafluoropropylene copolymer as a binder, 150 parts by weight of N,N-dimethylacetamide and 40 parts by weight of dibutyl phthalate was applied on a copper foil having a thickness of 40 μm so as to adjust the film obtained after drying to 200 μm, and then dried at 150° C. After pressing using a hot roll, a negative electrode was obtained. The negative electrode has a total thickness of about 150 μm.

(Production of Simple Test Cell)

The resulting positive and negative electrodes and the separator obtained in Example 7 were cut into a predetermined size and then laminated with each other. In this case, they were laminated with each other so that each active material surface of the respective electrodes is contacted with the separator.

The resulting laminate was integrated with heating and an electrode terminal was connected to the respective electrodes. After impregnating with an electrolytic solution prepared by dissolving 1 mol/l of $LiPF_6$ in a mixed solvent of ethylene carbonate and dimethyl carbonate at a weight ratio of 1:1, the impregnated laminate was enclosed in an aluminum laminate pack to obtain a test cell.

(Evaluation of Test Cell)

With respect to the test cell thus obtained, charge and discharge cycles were repeated 50 times. After comparing an initial discharge capacity with a discharge capacity after 50 cycles, a capacity retention ratio was calculated. After 50 charge and discharge cycles, the test cell was disassembled and adhesion between the separator and electrodes of Example 7 was visually observed. The results are shown in Table 5.

Examples 12 to 14 and Comparative Examples 7 to 10

In the same manner as in Example 11, except that separators shown in Table 5 were used as the separator, test cells were produced and evaluated. The results are shown in Table 5.

TABLE 5

|  | Kind of separator used | Volume retention ratio[1] (%) | Adhesion[2] |
|---|---|---|---|
| Example 11 | Example 7 | 93 | A (porous layer side) |
| Example 12 | Example 8 | >95 | A |
| Example 13 | Example 9 | >95 | A |
| Example 14 | Example 10 | >95 | A |
| Comparative Example 7 | Comparative Example 3 | 81 | C |
| Comparative Example 8 | Comparative Example 4 | 73 | C |

TABLE 5-continued

| | Kind of separator used | Volume retention ratio[1] (%) | Adhesion[2] |
|---|---|---|---|
| Comparative Example 9 | Comparative Example 5 | 80 | B |
| Comparative Example 10 | Comparative Example 6 | 76 | B |

[1] discharge capacity after 50 cycles/initial discharge capacity × 100(%)
[2] A (excellent): firmly adhered B (ordinary): partial peeling or space observed C (poor): total peeling or space observed As is apparent from the results of Table 5, the simple test cells using the separators produced in Examples 7 to 10 maintained high capacity retention ratios even after 50 cycles, while the simple test cells using the separators produced in Comparative Examples 3 to 6 showed drastic reduction in capacity. The test cells of Examples 11 to 13 provided with the separators of Examples 7 to 9 maintained high capacity retention ratio of 80% or more after 300 cycles and exhibited excellent cycle characteristics (this result is not shown in Table 5).

With respect to adhesion between electrodes and the separator after 50 cycles, in the test cells of Examples 11 to 14, electrodes firmly adhere to the surface of the separators of Example 7 to 10 provided with a porous layer containing a vinylidene fluoride resin as a main component and it was difficult to easily peel electrodes. In the test cells of Comparative Examples 7 and 8, total peeling was observed and, in the test cells of Comparative Examples 9 and 10, partial peeling was observed and the electrolytic solution oozed out at the portion. As is apparent from these results, retention properties of the electrolytic solution deteriorate and the electrolytic solution oozes out from the interior of the separator to cause peeling, even if the separators have a layer containing a vinylidene fluoride resin as a main component and this layer is contacted with electrodes, unless it is controlled so that the external surface of the layer has an average pore size of 0.1 to 5 μm, the interior of the layer has an average pore size of 0.5 to 10 μm, and the average pore size of the external surface is less than that of the interior.

What is claimed is:

1. A separator for lithium ion secondary battery, comprising a porous base material containing polyolefin, and a porous layer containing a vinylidene fluoride resin as a main component provided on at least one surface of the porous base material, wherein
    the porous layer contains at least one vinylidene fluoride resin having a weight-average molecular weight of 150,000 to 500,000 in an amount of 50% by weight or more based on the overall vinylidene fluoride resin, the average pore size of an external surface is less than that of an interior in the porous layer, and
    the external surface has an average pore size of 0.1 to 5 μm and the interior has an average pore size of 0.5 to 10 μm in the porous layer.

2. The separator for lithium ion secondary battery according to claim 1, wherein
    air permeability, as measured by a Gurley air permeability tester, of the porous base material is 1000 sec/100 ml or less, and
    the porous base material has a porosity of 20 to 80% by volume.

3. The separator for lithium ion secondary battery according to claim 2, wherein the porous layer has a thickness of 0.1 to 5 μm.

4. The separator for lithium ion secondary battery according to claim 2, wherein the porous layer has an average pore size of 0.01 to 10 μm.

5. The separator for lithium ion secondary battery according to claim 1, wherein the porous layer has a weight of 0.5 to 10 g/m².

6. The separator for lithium ion secondary battery according to claim 1, wherein the porous layer has a thickness of 0.5 to 8 μm.

7. The separator for lithium ion secondary battery according to claim 1, wherein the porous base material has a thickness of 5 to 50 μm.

8. The separator for lithium ion secondary battery according to claim 1, wherein the vinylidene fluoride resin is a homopolymer of vinylidene fluoride, or a copolymer of at least one of ethylene tetrafluoride, propylene hexafluoride and ethylene, and vinylidene fluoride, or a mixture of the homopolymer and the copolymer.

9. The separator for lithium ion secondary battery according to claim 1, wherein air permeability as measured by a Gurley air permeability tester is 1000 sec/100 ml or less.

10. A lithium ion secondary battery provided with the separator for lithium ion secondary battery according to claim 1.

11. A lithium ion secondary battery comprising:
    a positive electrode obtained by bonding a positive electrode active material to a positive electrode current collector,
    a negative electrode obtained by bonding a negative electrode active material to a negative electrode current collector,
    the separator for lithium ion secondary battery according to claim 1 disposed and bonded between the positive electrode and the negative electrode, and an electrolytic solution containing lithium ions held in the separator.

* * * * *